B. H. PAUGH.
CONCRETER'S BOLT.
APPLICATION FILED MAR. 3, 1909.
945,863.
Patented Jan. 11, 1910.
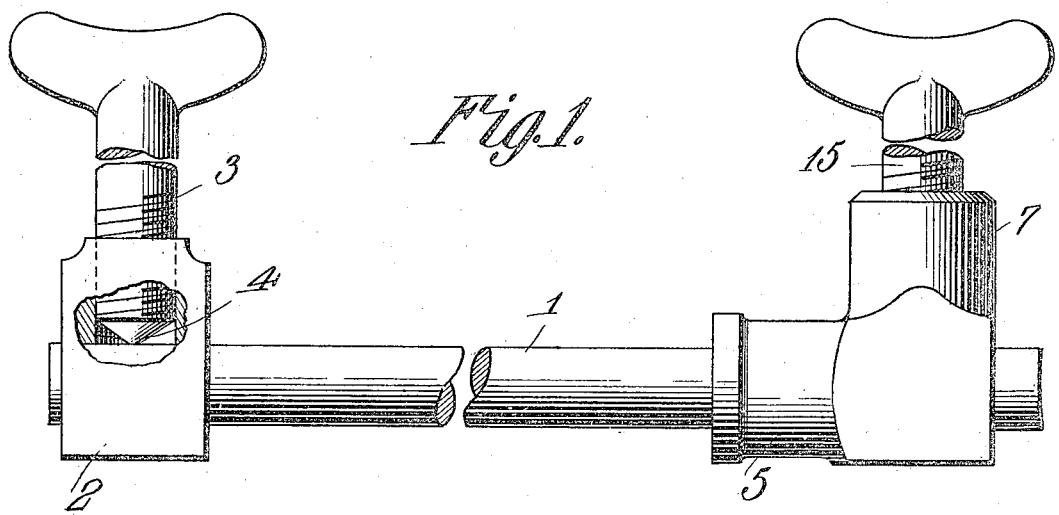
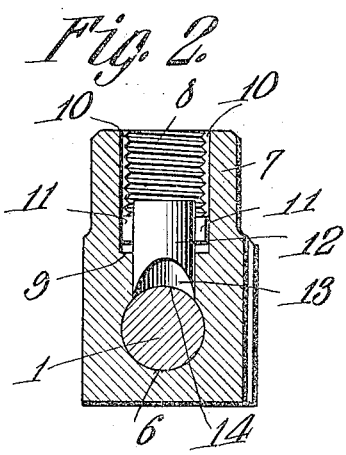
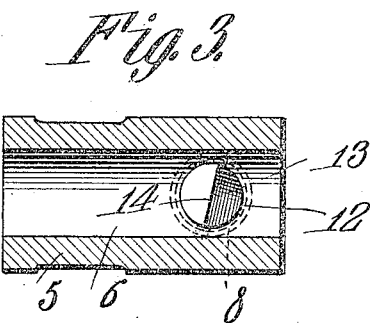
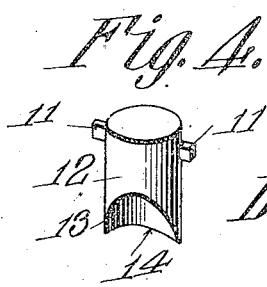
Benjamin H. Paugh
Inventor
Witnesses:
By Cashow & Co.
Attorneys

UNITED STATES PATENT OFFICE.

BENJAMIN H. PAUGH, OF PARSONS, WEST VIRGINIA.

CONCRETER'S BOLT.

945,863.  Specification of Letters Patent.  Patented Jan. 11, 1910.

Application filed March 3, 1909. Serial No. 481,105.

*To all whom it may concern:*

Be it known that I, BENJAMIN H. PAUGH, a citizen of the United States, residing at Parsons, in the county of Tucker and State of West Virginia, have invented a new and useful Concreter's Bolt, of which the following is a specification.

This invention relates to a bolt designed more particularly for use by concreters in clamping together the walls of molding boxes.

The object of the invention is in a ready and practical manner to dispense with the employment of the ordinary headed and threaded bolts and nuts, usually employed as a clamping means, as well as the use of wrenches, and in lieu thereof to provide a novel device to secure the above-stated results, that shall provide in a simple and compact form, a bolt, head and nut, the latter embodying means to thread the bolt when being seated, whereby to permit the use of plain, unthreaded bars of metal for the bolts, and thus effect a large saving in material, as the bars may be threaded repeatedly, thus always to insure proper holding of the nuts in position.

With the above and other objects in view, as will appear as the nature of the invention is better understood, the same consists in the novel construction and combination of parts of a bolt for concreters' use, as will be hereinafter fully described and claimed.

In the accompanying drawing forming a part of this specification, and in which like characters of reference indicate corresponding parts: Figure 1 is a view in side elevation, partly in section, of a bolt constructed in accordance with the present invention. Fig. 2 is a view in vertical transverse section, through the nut. Fig. 3 is a view in horizontal section through the nut. Fig. 4 is a perspective detail view of a chaser used in conjunction with the nut.

The bolt embodies a shank 1 constructed from a length of bar metal, that is preferably devoid of threads, a head 2 slidably mounted on the shank and carrying a set screw 3 having a conical inner end 4, and a nut comprising a shank-receiving sleeve 5 having a smooth bore 6 and a socket 7 disposed at right angles to the sleeve and having a threaded bore 8 that intersects that of the sleeve. The inner end of the bore 8 is constricted, forming thereby a shoulder 9, and is provided with two longitudinal grooves or channels 10 that extend from the outer end of the socket to the shoulder 9. The channels 10 are engaged by the terminals 11 of a pin carried by a chaser 12 which fits within the bore 8 and projects at its inner end within the bore 6 and is limited in its inward movement by the shoulder. The point or inner end 13 of the chaser is curvilinear wedge shaped and the thread-cutting edge 14 is concave to conform approximately to the exterior of the shank. The edge 14 is disposed obliquely relatively to the longitudinal axis of the sleeve, in order to cause it to cut a screw thread on the shank when the nut is turned, to effect which a combined set screw and operating lever 15 is provided which may be of any length, and is threaded into the socket and bears at its inner end against the chaser. As the chaser will have an extended range of adjustment, it will be obvious that the shank need not of necessity fit snugly within the sleeve, and this feature will be found of peculiar advantage, as in the event that the shank is smaller than the bore of the sleeve, no intereference with the proper operation of the nut will result.

In the use of the device, after the shank and head have been properly positioned, the nut is slipped on to the shank, and the set screw is tightened sufficiently to bring the chaser into engagement with the shank, and upon the nut being turned, a thread will be formed upon the shank which will operate to cause the sleeve to bear firmly against the mold box. When the proper adjustment has been secured, the set screw is tightened sufficiently to prevent any movement of the nut relatively to the shank.

By the provision of this self-threading nut, the necessity of employing washers, which frequently has to be resorted to, where the threaded portion of the bolt is not of sufficient length to allow the nut to bear against the box, will be eliminated, and furthermore, a marked saving in material will result.

What is claimed is:

1. A bolt for use in molding concrete comprising a bar adapted to be inserted through the mold, a head mounted on one end of the bar to bear against one side of the mold, and a nut mounted on the opposite end of the bar to bear against the opposite side of the mold and embodying a chaser to engage the bar.

2. A bolt for use in molding concrete comprising a bar adapted to be inserted through the mold, a head adjustably mounted on one end of the bar to bear against one side of the mold, a nut mounted on the opposite end of the bar to bear against the opposite side of the mold, a chaser within the nut to engage the bar, and means for forcing the chaser into engagement with the bar.

3. A bolt embodying a shank, a head loosely mounted on one end of the shank and provided with a set screw, a nut mounted on the other end of the shank, a chaser carried by the nut, and a combined set screw and operating lever threaded into the nut to force the chaser into engagement with the shank.

4. A bolt of the class described embodying a shank having a head loosely mounted on one end thereof, said head being provided with a set screw, a nut mounted on the other end of said shank, a chaser carried by the nut having a transverse retaining pin in the upper extremity thereof, and a combined set screw and operating lever threaded into the nut to force the chaser into engagement with the shank.

5. A bolt embodying a shank, a head loosely mounted on one end of the shank and provided with a set screw, a nut on the other end of said shank having a pair of vertically extending slots in the orifice therein, a chaser carried in the nut having a transverse pin adapted to be engaged in said slot, and a combined set screw and operating lever threaded in the nut to force the chaser into engagement with the shank.

6. A bolt embodying a shank, a head loosely mounted on one end of the shank and provided with a set screw, a nut having a horizontal orifice adapted to receive said shank, and a vertically extending threaded slotted orifice opening in the said horizontal orifice, a chaser carried in said nut having a transverse pin adapted to be retained in said orifice, and a set screw operating and bearing against the upper face of said chaser adapted to bring the same in engagement with the shank.

7. A bolt embodying a shank, a head loosely mounted on one end of the shank and provided with a set screw, a nut on the other end of said shank, a chaser carried in said nut having a curvilinear cutting edge at its lower extremity, and a set screw bearing against the upper end of said chaser adapted to bring the cutting edge thereof in operative engagement with the shank, as and for the purpose set forth.

In testimony that I claim the foregoing as my own, I have hereto affixed my signature in the presence of two witnesses.

BENJAMIN H. PAUGH.

Witnesses:
W. L. PARSONS,
F. W. PRITT.